423-263
1/6/87 OR H 000,197 SR

United States Statutory Invention Registration [19]

[11] Reg. Number: H197

[43] Published: Jan. 6, 1987

Takeshita et al.

[54] TERNARY RARE EARTH-LANTHANIDE SULFIDES

[75] Inventors: Takuo Takeshita, Omiya, Japan; Karl A. Gschneidner, Jr.; Bernard J. Beaudry, both of Ames, Iowa

[73] Assignee: The United States of America as represented by the United States Department of Energy, Washington, D.C.

[21] Appl. No.: 836,881

[22] Filed: Mar. 6, 1986

[51] Int. Cl.[4] ..... C01F 17/00
[52] U.S. Cl. ..... 423/263; 423/511
[58] Field of Search ..... 423/263

[56] References Cited

U.S. PATENT DOCUMENTS 4,545,967 10/1985 Reynolds et al. ..... 423/263

OTHER PUBLICATIONS

Spedding et al., Ed., "The Rare Earths", John Wiley & Sons, N.Y., 1961, pp. 9–12, 19, 20, 23.

*Primary Examiner*—Richard D. Lovering
*Assistant Examiner*—Jack Thomas
*Attorney, Agent, or Firm*—James W. Weinberger; Arthur A. Churm; Judson R. Hightower

[57] ABSTRACT

A new ternary rare earth sulfur compound having the formula:

$$La_{3-x}M_xS_4$$

where M is a rare earth element selected from the group europium, samarium and ytterbium and x=0.15 to 0.8.

The compound has good high-temperature thermoelectric properties and exhibits long-term structural stability up to 1000° C.

5 Claims, 2 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

TERNARY RARE EARTH-LANTHANIDE SULFIDES

CONTRACTUAL ORIGIN OF THE INVENTION

The United States Government has rights in this invention pursuant of Contract No. W-7405-ENG-82 between the U.S. Department of Energy and Ames Laboratory.

BACKGROUND OF THE INVENTION

The invention relates to a new ternary rare earth sulfur compound. More specifically the invention relates to a new lanthanum rare earth sulfur compound which is stable at high temperatures and which has good high temperature, n-type theremoelectric properties.

Lanthanum sulfur compounds of the formula $La_3S_4$ are known to possess good thermoelectric properties. However, when these compounds are subjected to temperature above about 800° C., phase changes occur within the material which, when it is subsequently cooled, result in the formation of small cracks within the material. This cracking reduces the electrical conductivity of the material, and consequently reduces or destroys the thermoelectric properties. Efforts to stabilize these compounds to prevent or reduce the phase changes have included the addition of small amounts of some of the alkaline earth elements as described in U.S. patent application Ser. No. 470,114 filed Feb. 28, 1983. As described therein, from about 0.1 to about 5 weight percent of calcium, barium, or strontium is added to the lanthanum sulfide to stabilize the compound in the preferred cubic phase.

SUMMARY OF THE INVENTION

A new ternary rare earth sulfur compound has been prepared which has the formula:

$$La_{3-x}M_xS_4$$

where M is one or more elements selected from the group of europium, samarium and ytterbium and x=0.15 to 0.8.

The new compound has been found to remain stable in the preferred cubic $Th_3P_4$ type structure at temperature's over 1000° C. for periods up to a several thousand hours, and has been shown to exhibit very little volatility over this period of time and at this temperature. The Seebeck coefficient of this ternary lanthanum sulfide increases with increasing temperature up to the maximum temperature to which it has been tested.

It is therefore one object of the invention to provide a new lanthanum rare earth sulfide compound.

It is another object of the invention to provide a new thermoelectric material which is stable to phase changes at high temperatures.

Finally, it is the object of the invention to provide a new ternary lanthanum rare earth sulfide compound which has good high-temperature thermoelectric properties and which is stable to phase changes at temperatures over 800° C.

DETAILED DESCRIPTION OF THE INVENTION

Figure 1:
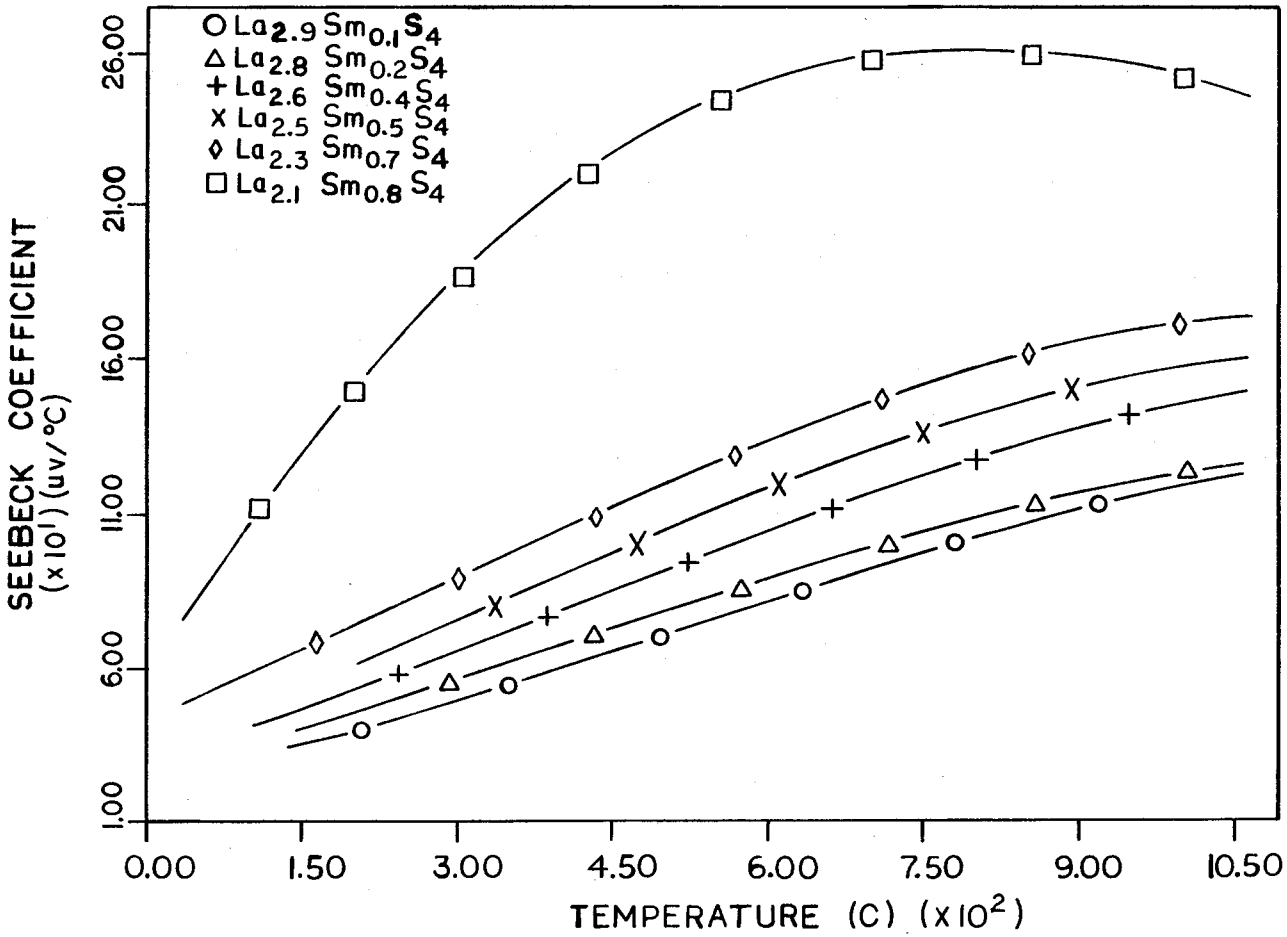
FIG. 1 is a graph of Seebeck coefficient vs temperature for a number of $La_{3-x}Sm_xS_4$ compounds.
Figure 2:
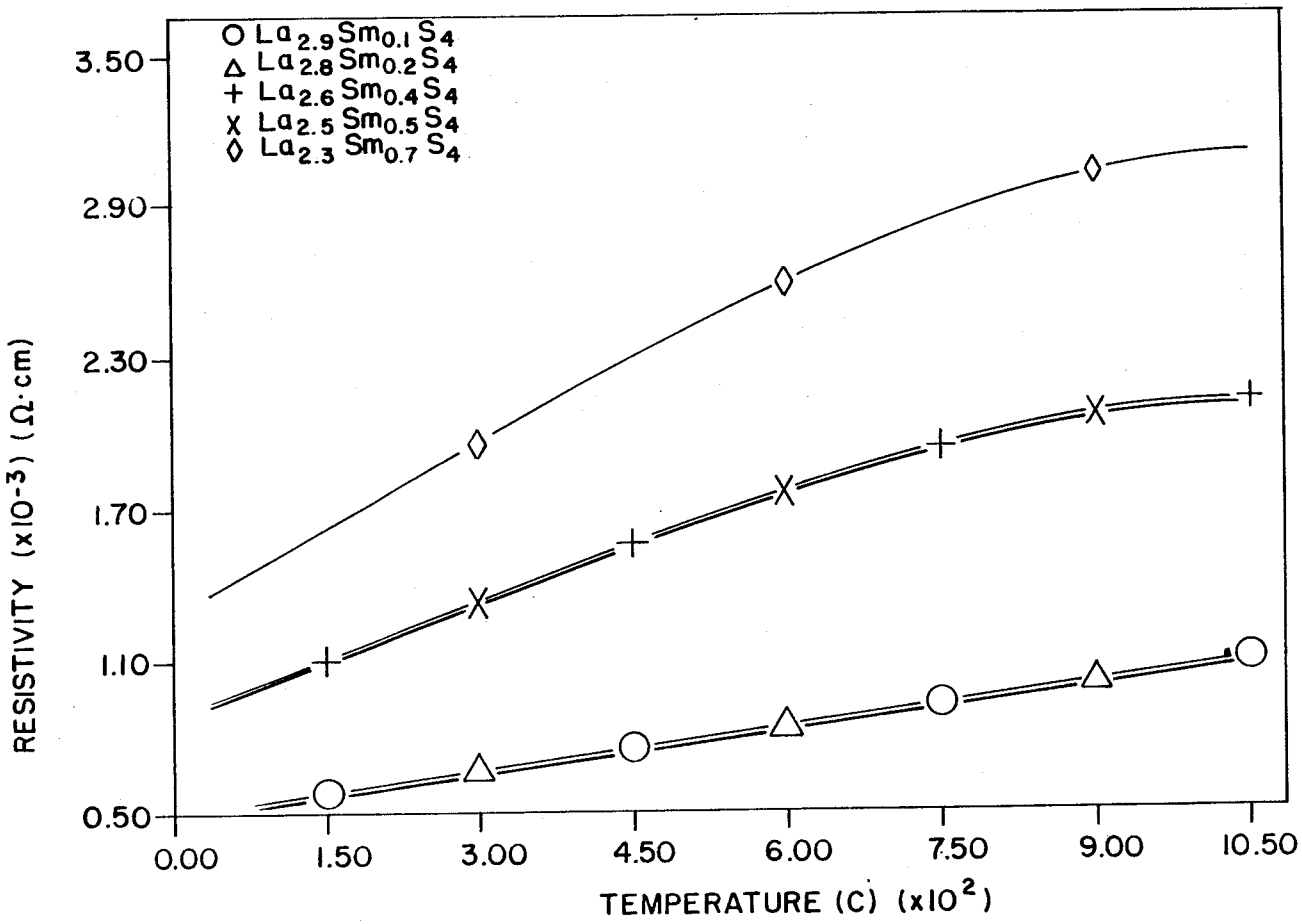
FIG. 2 is a graph of Resistivity vs temperature for the $La_{3-x}Sm_xS_4$ compounds of FIG. 1.

These and other objects of the invention may be met by providing a ternary lanthanum rare earth compound having the formula:

$$La_{3-x}M_xS_4$$

where M is one or more elements selected from the group consisting of europium, samarium and ytterbium and x=0.15 to 0.8.

The compound may be prepared by mixing together powders of the elements, in the correct proportions and heating the mixture in an evacuated quartz ampoule slowly to a temperature of 1100° to 1200° C. for a period of time sufficient for the materials to homogenize and form the compound of the invention.

Another method involves the direct reaction of sulfur on pieces of the rare earth metal. The sulfur and pieces of metal are sealed in a capsule and heated to 1000° to 1100° C. for a period of up to 200 hours. The use of pieces of metal rather that a powder make it easier to control the purity of the final product.

A preferred method for preparing the compound of the invention is by pressure assisted reaction sintering (PARS). By this method, a stoichiometric amount of fine powders of lanthanum sesquisulfide ($La_2S_3$), rare earth monosulfide and lanthanum trihydride are mixed together and pressed at about 1500° C. at a pressure of about 6000 psi; under a vacuum of about $10^{-2}$ torr. Products produced by this method have been shown to be single phase compounds of the desired cubic $Th_3P_4$ type with a density of about 90% of theoretical or higher.

The amount of rare earth (Sm, Eu and Yb) varies from about 4 to about 22 weight percent, i.e. x=0.15 to 0.8 of the compound, but preferably will vary from about 4 to 14 weight percent, i.e. x=0.15 to 0.5.

The following examples are given to illustrate the invention only and are not to be taken as limiting the scope of the invention which is defined by the appended claims.

EXAMPLE I $La_2S_3$ was prepared by heating lanthanum metal and sulfur in a quartz ampoule to about 1000° to 1100° C. for a period of time sufficient for the $La_2S_3$ to form. In a like manner, EuS was also prepared. Lanthanum metal was reacted with hydrogen gas in a stainless steel container to prepare $LaH_3$. The products of these preparations were ground into fine powders (<150 mesh) in a helium filled dry box, 3.6 g of $La_2S_3$ was mixed together with 0.431 g EuS and 0.257 g of $LaH_3$. The mixed powders were pressed into a pellet by the pressure assisted sintering technique at about 1550° C. at a pressure of 6,000 psi under a vacuum of $<10^{-2}$ torr for 2 hours. The product was analyzed by powder X-ray diffraction and was shown to be a single phase of the cubic $Th_3P_4$ type structure.

Measurements were made on the material to determine the Seebeck coefficient and resistivity from 100° to 1000° C. The results are given in Table I below:

TABLE I

| T (°C.) | SEEBECK COEFFICIENT s(μV/ · c) | RESISTIVITY P(m Ω cm) |
|---|---|---|
| 100 | −35.5 | 0.652 |

TABLE I-continued

| T (°C.) | SEEBECK COEFFICIENT s(μV/ · c) | RESISTIVITY P(m Ω cm) |
|---|---|---|
| 200 | −46.5 | 0.745 |
| 300 | −58.5 | 0.835 |
| 400 | −70.0 | 0.930 |
| 500 | −81.0 | 1.020 |
| 600 | −92.0 | 1.112 |
| 700 | −103.0 | 1.205 |
| 800 | −113.0 | 1.295 |
| 900 | −123.0 | 1.385 |
| 1000 | −132.0 | 1.480 |

As can be seen from the Table, the Seebeck coefficient continues to rise with the increase in temperature.

EXAMPLE II

A long term stability test was initiated for the $La_{3-x}Sm_xS_4$ (x=0.1 to 0.7) ternary system. The sample rods, approximately ¼" in diameter and ¾" in length were contained in graphite crucibles, 1 cm in diameter and 10 cm in length. After 1,895 hours at 1100° C. in a vacuum of $10^{-8}$ torr, the weight loss was, at most, 0.33%, but was typically 0.25%. These vaporization rates were 10 to 20 times smaller than those of SiGe (GaP) alloys at the same temperature, but 2 to 10 times greater than the same ternary material where x=0.7 to 0.9. The room temperature electrical resistivities generally decreased (x=0.3 to 0.7) while they increased where x=0.1 and 0.2.

As has been demonstrated by the preceeding discussion and examples, the ternary lanthanum rare earth sulfide compounds of the invention provide good high-temperature thermoelectric properties and has the structural stability suitable for long-term high-temperature thermoelectric power generation facilities.

The embodiments of this invention in which an exclusive property or privilege is claimed are defined as follow:

1. A ternary rare earth sulfur compound having the formula:

$$La_{3-x}M_xS_4$$

where M is a rare earth element selected from the group consisting of europium, samarium and ytterbium, and x=0.15 to 0.8.

2. The compound of claim 1 wherein x=0.15 to 0.5.

3. The compound of claim 2 having the formula:

$$La_{3-x}Eu_xS_4.$$

4. The compound of claim 2 having the formula:

$$La_{3-x}Sm_xS_4.$$

5. The compound of claim 2 having the formula:

$$La_{3-x}Yb_xS_4.$$

* * * * *